US008661204B2

(12) United States Patent
Dwarkadas et al.

(10) Patent No.: US 8,661,204 B2
(45) Date of Patent: Feb. 25, 2014

(54) MECHANISM TO SUPPORT FLEXIBLE DECOUPLED TRANSACTIONAL MEMORY

(75) Inventors: Sandhya Dwarkadas, Pittsford, NY (US); Arrvindh Shriraman, Rochester, NY (US); Michael Scott, Rochester, NY (US)

(73) Assignee: University of Rochester, Office of Technology Transfer, Rochester, NY (US)

( * ) Notice: Subject to any disclaimer, the term of this patent is extended or adjusted under 35 U.S.C. 154(b) by 0 days.

(21) Appl. No.: 13/422,544

(22) Filed: Mar. 16, 2012

(65) Prior Publication Data

US 2012/0179877 A1 Jul. 12, 2012

Related U.S. Application Data

(62) Division of application No. 12/192,696, filed on Aug. 15, 2008, now abandoned.

(60) Provisional application No. 60/935,470, filed on Aug. 15, 2007.

(51) Int. Cl.
*G06F 12/00* (2006.01)
*G06F 13/00* (2006.01)

(52) U.S. Cl.
USPC ........... 711/141; 711/147; 711/163; 711/167; 711/205

(58) Field of Classification Search
USPC ........................ 711/141, 147, 163, 167, 205
See application file for complete search history.

(56) References Cited

U.S. PATENT DOCUMENTS

2007/0113020 A1 5/2007 Gunna

OTHER PUBLICATIONS

Burton H. Bloom, "Space/Time Trade-offs in Hash Coding with Allowable Errors", Communications of the ACM, vol. 13, No. 7, Jul. 1970, pp. 422-426.
Colin Blundell et al., Subtleties of Transactional Memory Atomicity Semantics, IEEE Computer Society, vol. 5, No. 2, (2006), (4 pages).
Jayaram Bobba et al., Performance Pathologies in Hardware Transactional Memory, Department of Computer Sciences. University of Wisconsin-Madison (11 pages), Jun. 9-13, 2007.
Luis Ceze et al., "Bulk Disambiguation of Speculative Threads in Multiprocessors", IEEE, (2006). (12 pages).
Luis Ceze et al., BulkSC: Bulk Enforcement of Sequential Consistency, University of Illinois at Urbana-Champaign, (12 pages), Jun. 9-13, 2007.
Dave Dice, "Transactional Locking II", Sun Microsystems Laboratories, Burlington MA, (2006),pp. 194-208.
Keir Fraser et al., "Concurrent Programming Without Locks", ACM Transactions on Comouter Syst4ems, vol. 25. No. 2, Article 5, Pub date May 2007. pp. 1-61.
Sanjeev Kumar et al., "Hybrid Transactional Memory", (2006), (12 pages).

(Continued)

*Primary Examiner* — Midys Rojas
(74) *Attorney, Agent, or Firm* — Harris Beach PLLC

(57) ABSTRACT

The present invention employs three decoupled hardware mechanisms: read and write signatures, which summarize per-thread access sets; per-thread conflict summary tables, which identify the threads with which conflicts have occurred; and a lazy versioning mechanism, which maintains the speculative updates in the local cache and employs a thread-private buffer (in virtual memory) only in the rare event of an overflow. The conflict summary tables allow lazy conflict management to occur locally, with no global arbitration (they also support eager management). All three mechanisms are kept software-accessible, to enable virtualization and to support transactions of arbitrary length.

12 Claims, 5 Drawing Sheets

(56) References Cited

OTHER PUBLICATIONS

Virendra J. Marathe et al., Adaptive Software Transactional Memory, Department of Computer Science, University of Rochester, Rochester, NY. May 2005, pp. 1-15.

Milo M. K. Martin et al., Multifacet's General Execution-driven Multiprocessor Simulator (GEMS) toolset, Computer Architecture News (CAN), Sep. 2005, pp. 1-8.

Chi Cao Minh et al., An Effective Hybrid Transactional Memory System with Stong Isolation Guarantees, Computer Systems Laboratory, Stanford University, (2007), (12 pages).

Kevin E. Moore et al., "LogTM: Log-based Transactional Memory", HPCA-12, Austin, TX, Feb. 11-15, 2006, pp. 1-12.

Ravi Rajwar et al., "Virtualizing Transactional Memory", IEEE (2005) (12 pages).

Bratin Saha et al., "McRT-STM: A High Performance Software Transactional Memory System for a Multi-Core Runtime", New York, NY, pp. 187-197, Mar. 29-31, 2006.

Nabeel Sakran et al., "The Implementation of the 65 nm Dual-Core 648 Merom Processor", IEEE International Solid-State Circuits Conference 2007, (3 pages).

William N. Scherer III et al., "Advanced Contention Management for Dynamic Software Transactional Memory". PODC, 2005, Las Vegas, Nevada, pp. 240-248.

Daniel Sanchez et al., "Implementing Signatures for Transactional Memory", IEEE/ACM Sumposium on Microarchitecture (MICRO-40). 2007, pp. 1-11.

Michael L. Scott et al., "Delaunay Triangulation with Transactions and Barriers", Department of Computer Science, University of Rochester. IEEE 2007. pp. 107-113.

Arrvindh Shriraman et al., "An Integrated Hardware-Software Approach to Flexible Transactional Memory", Department of Computer Science, University of Rochester, (ISCA 2007) pp. 104-115.

Arrvindh Shriraman et al., "Flexible Decoupled Transactional Memory Support", Department of Computer Science, University of Rochester, IEEE 2008, pp. 139-150.

Michael F. Spear et al., "Conflict Detection and Validation Strategies for Software Transactional Memory", Department of Computer Science, University of Rochester, LNCS 4167 2006. pp. 179-193.

Michael F. Spear et al., "Brief Announcement: Privatization Techniques for Software Transactional Memory"/, PODC 2007. pp. 338-339.

Luke Yen, et al., "LogTM-SE: Decoupling Hardware Transactional Memory from Caches", IEEE 2007. OPS. 261-272.

Non-Final Office Action dated Mar. 16, 2011 received in U.S. Appl. No. 12/192,969.

Final Office Action dated Jan. 5, 2012 received in U.S. Appl. No. 12/192,696.

Maurice Herlihy et al. "Software Transactional Memory for Dynamic-Size Date", PODC 2003 (9 pages).

```
Commit()  /* non-blocking, pre-emptible */
1.  copy-and-clear W-R and W-Wregisters
2.  foreach i set in W-R or W-W
3.      abort_id = manage.conflict(my_id, i)
4.      if (abort.id ≠ NULL)        // not resolved by waiting
5.          CAS(TSW(abort.id), active, aborted)
6.  CAS-Commit(TSW(my_id), active, committed)
7.  if (TSW(my_id) = active)        // failed due to nonzero CST
8.      goto 1
```

X;X-Y represents throughput of X when X and Y run simultaneously on the machine with Eager (E) or Lazy (L) conflict management. Throughput is normalized to a 1-thread run of X, running in isolaltion.

MECHANISM TO SUPPORT FLEXIBLE DECOUPLED TRANSACTIONAL MEMORY

REFERENCE TO RELATED APPLICATION

The present application claims the benefit of U.S. Provisional Patent Application No. 60/935,470, filed Aug. 15, 2007, whose disclosure is hereby incorporated by reference in its entirety into the present disclosure.

STATEMENT OF GOVERNMENT INTEREST

The work leading to the present invention was supported by NSF grants CCF-0702505, CCR-0204344, CNS-0411127, CNS-0615139 and CNS-0509270 and by NIH grant 1 R21 GM079259-01A1. The government has certain rights in the invention.

FIELD OF THE INVENTION

The present invention is directed to computer memory and more particularly to transactional computer memory in which the hardware requirements for concurrent access tracking, speculative update buffering and conflict management are decoupled from one another.

DESCRIPTION OF RELATED ART

Transactional Memory addresses one of the key challenges of programming multicore systems: namely, the complexity of lock-based synchronization. At a high level, the programmer or compiler labels sections of the code in a single thread as atomic. The underlying system is expected to execute this code atomically, consistently, and in isolation from other transactions, while exploiting as much concurrency as possible.

Most TM systems execute transactions speculatively and must thus be prepared for data conflicts when concurrent transactions access the same location and at least one of the accesses is a write. Conflict detection refers to the mechanism by which such conflicts are identified. Conflict management is responsible for arbitrating between conflicting transactions and deciding which should abort. Pessimistic (eager) systems perform both conflict detection and conflict management as soon as possible. Optimistic (lazy) systems delay conflict management until commit time (though they may detect conflicts earlier). TM systems must also perform version management, either buffering new values in private locations (a redo log) and making them visible at commit time, or buffering old values (an undo log) and restoring them on aborts. Undo logs are considered an orthogonal form of eagerness (they put updates in the "right" location optimistically); redo logs are considered lazy.

The mechanisms required for conflict detection, conflict management, and version management can be implemented in hardware (HTM) [1, 12, 14, 23, 24], software (STM) [9, 10, 13, 19, 25], or some hybrid of the two (HyTM) [8, 16, 22, 30]. Full hardware systems are typically inflexible in policy, with fixed choices for eagerness of conflict management, strategies for conflict arbitration and back-off, and eagerness of versioning. Software-only systems are typically slow by comparison, at least in the common case. Several systems have advocated decoupling of the hardware components required for TM, giving each a well-defined API that allows them to be implemented and invoked independently. It has been argued that decoupling makes it easier to refine an architecture incrementally and that decoupling helps to separate policy from mechanism, thereby enabling flexibility in the choice of policy. It has been suggested that decoupling may allow TM components to be used for other, nontransactional purposes.

Several papers have found performance pathologies with certain policy choices (eagerness of conflict management; arbitration and back-off strategy) in certain applications [4, 28, 30, 320. RTM [30] promotes policy flexibility by decoupling version management from conflict detection and management—specifically, by separating data and metadata, and performing conflict detection only on the latter. While RTM hardware provides a single mechanism for both conflict detection and management, software can choose (by controlling the timing of metadata inspection and updates) when conflicts are detected. Unfortunately, metadata management imposes significant software costs.

Transactional memory is a very active area. The Bulk system decouples conflict detection from cache tags by summarizing transaction read/write sets in Bloom filter signatures. To commit, a transaction broadcasts its write signatures to all other transactions, which then compare to their own read and write signatures to detect conflicts. Conflict management (arbitration) is first-come-first-served, and requires global synchronization in hardware to order commit operations.

LogTM-SE [36] integrates the cache-transparent eager versioning mechanism of LogTM [23] with Bulk style signatures. LogTM-SE supports efficient virtualization (i.e., context switches and paging), but this is closely tied to eager versioning (undo logs), which in turn requires eager conflict detection and management to avoid inconsistent reads in a transaction. Also, since LogTM does not allow transactions to abort one another, it is possible for running transactions to "convoy" behind a suspended transaction.

UTM [1] and VTM [24] both perform lazy versioning using virtual memory, although they employ different data structures. UTM uses a log pointer per memory block. On a cache miss (local or forwarded request), a hardware controller walks an uncacheable in-memory data structure that specifies access permissions.

VTM employs tables maintained in software and uses software routines to walk the table only on cache misses that hit in a locally cached lookaside filter. Like LogTM, both VTM and UTM require eager conflict management.

Hybrid TMs [8, 16] explore software approaches to handle transactions that overflow time and space resources while employing the underlying HTM system to handle common case bounded transactions. Hybrid TMs must maintain metadata compatible with the fallback STM and use policies compatible with the underlying HTM. SigTM [22] employs hardware signatures for conflict detection but uses a (always on) TL-2 [9] style software redo-log for versioning. Similar to the hybrid systems, it suffers from per-access metadata bookkeeping overheads. Furthermore, it supports only limited policies for contention management (i.e., only self aborts) and requires expensive commit time arbitration on every speculatively written location.

RTM [30] explored hardware acceleration of a TM fundamentally controlled in software. Specifically, it introduced (1) Alert-On-Update (AOU), which triggers a software handler when pre-specified lines are modified remotely, and (2) Programmable Data Isolation (PDI), which buffers speculative writes in (potentially incoherent) local caches. To decouple version management from conflict detection and management, however, RTM software had to segregate data and metadata, retaining much of the bookkeeping cost of all-software TM systems.

The following references provide background information:

[1] C. S. Ananian, K. Asanovic, B. C. Kuszmaul, C. E. Leiserson, and S. Lie. Unbounded Transactional Memory. 11*th Intl. Symp. on High Performance Computer Architecture*, February 2005.

[2] B. H. Bloom. Space/Time Trade-Off in Hash Coding with Allowable Errors. *Comm. of the ACM,* 13(7), July 1970.

[3] C. Blundell, E. C. Lewis, and M. M. K. Martin. Subtleties of Transactional Memory Atomicity Semantics. *IEEE Computer Architecture Letters,* 5(2), November 2006.

[4] J. Bobba, K. E. Moore, H. Volos, L. Yen, M. D. Hill, M. M. Swift, and D. A. Wood. Performance Pathologies in Hardware Transactional Memory. 34*th Intl. Symp. on Computer Architecture*, June 2007.

[5] L. Ceze, J. Tuck, C. Cascaval, and J. Torrellas. Bulk Disambiguation of Speculative Threads in Multiprocessors. 33*rd Intl. Symp. on Computer Architecture*, June 2006.

[6] L. Ceze, J. Tuck, P. Montesinos, and J. Torrellas. BulkSC: Bulk Enforcement of Sequential Consistency. 34*th Intl. Symp. on Computer Architecture*, June 2007.

[7] H. Chafi, J. Casper, B. D. Carlstrom, A. McDonald, C. C. Minh, W. Back, C. Kozyrakis, and K. Olukotun. A Scalable, Non-blocking Approach to Transactional Memory. 13*th Intl. Symp. on High Performance Computer Architecture*, February 2007.

[8] P. Damron, A. Fedorova, Y. Lev, V. Luchangco, M. Moir, and D. Nussbaum. Hybrid Transactional Memory. 12*th Intl. Conf. on Architectural Support for Programming Languages and Operating Systems*, October 2006.

[9] D. Dice, O. Shalev, and N. Shavit. Transactional Locking II. 20*th Intl. Symp. on Distributed Computing*, September 2006.

[10] K. Fraser and T. Harris. Concurrent Programming Without Locks. *ACM Trans. On Computer Systems,* 25(2), May 2007.

[11] J. Friedrich, B. McCredie, N. James, B. Huott, B. Curran, E. Fluhr, G. Mittal, E. Chan, Y. Chan, D. Plass, S. Chu, H. Le, L. Clark, J. Ripley, S. Taylor, J. Dilullo, and M. Lanzerotti. Design of the Power6 Microprocessor. *Intl. Solid State Circuits Conf.*, February 2007.

[12] L. Hammond, V. Wong, M. Chen, B. Hertzberg, B. Carlstrom, M. Prabhu, H. Wijaya, C. Kozyrakis, and K. Olukotun. Transactional Memory Coherence and Consistency. 31*st Intl. Symp. on Computer Architecture*, June 2004.

[13] M. Herlihy, V. Luchangco, M. Moir, and W. N. Scherer III. Software Transactional Memory for Dynamic-sized Data Structures. 22*nd ACM Symp. on Principles of Distributed Computing*, July 2003.

[14] M. Herlihy and J. E. Moss. Transactional Memory: Architectural Support for Lock-Free Data Structures. 20*th Intl. Symp. on Computer Architecture*, San Diego, Calif., May 1993.

[15] M. D. Hill, D. Hower, K. E. Moore, M. M. Swift, H. Volos, and D. A. Wood. A Case for Deconstructing Hardware Transactional Memory Systems. TR 1594, Dept. of Computer Sciences, Univ. of Wisconsin-Madison, June 2007.

[16] S. Kumar, M. Chu, C. J. Hughes, P. Kundu, and A. Nguyen. Hybrid Transactional Memory. 11*th ACM Symp. on Principles and Practice of Parallel Programming*, March 2006.

[17] J. R. Larus and R. Rajwar. Transactional Memory, Synthesis Lectures on Computer Architecture. Morgan & Claypool, 2007.

[18] J. Laudon and D. Lenoski. The SGI Origin: A ccNUMA Highly Scalable Server. 24*th Intl. Symp. on Computer Architecture*, June 1997.

[19] V. J. Marathe, W. N. Scherer III, and M. L. Scott. Adaptive Software Transactional Memory. 19*th Intl. Symp. on Distributed Computing*, September 2005.

[20] V. J. Marathe, M. F. Spear, C. Heriot, A. Acharya, D. Eisenstat, W. N. Scherer III, and M. L. Scott. Lowering the Overhead of Software Transactional Memory. $1^{st}$ *ACM SIGPLAN Workshop on Transactional Computing*, Ottawa, ON, Canada, June 2006.

[21] M. M. K. Martin, D. J. Sorin, B. M. Beckmann, M. R. Marty, M. Xu, A. R. Alameldeen, K. E. Moore, M. D. Hill, and D. A. Wood. Multifacet's General Execution-driven Multiprocessor Simulator (GEMS) Toolset. *ACM SIGARCH Computer Architecture News*, September 2005.

[22] C. C. Minh, M. Trautmann, J. Chung, A. McDonald, N. Bronson, J. Casper, C. Kozyrakis, and K. Olukotun. An Effective Hybrid Transactional Memory System with Strong Isolation Guarantees. 34*th Intl. Symp. on Computer Architecture*, June 2007.

[23] K. E. Moore, J. Bobba, M. J. Moravan, M. D. Hill, and D. A. Wood. LogTM: Log-based Transactional Memory. 12*th Intl. Symp. on High Performance Computer Architecture*, February 2006.

[24] R. Rajwar, M. Herlihy, and K. Lai. Virtualizing Transactional Memory. 32*nd Intl. Symp. on Computer Architecture*, June 2005.

[25] B. Saha, A.-R. Adl-Tabatabai, R. L. Hudson, C. C. Minh, and B. Hertzberg. McRTSTM: A High Performance Software Transactional Memory System for a Multi-Core Runtime. 11*th ACM Symp. on Principles and Practice of Parallel Programming*, March 2006.

[26] N. Sakran, M. Yuffe, M. Mehalel, J. Doweck, E. Knoll, and A. Kovacs. The Implementation of the 65 nm Dual-Core 64b Merom Processor. *Intl. Solid State Circuits Conf.*, February 2007.

[27] D. Sanchez, L. Yen, M. D. Hill, and K. Sankaralingam. Implementing Signatures for Transactional Memory. 40*th Intl. Symp. on Microarchitecture*, December 2007.

[28] W. N. Scherer III and M. L. Scott. Advanced Contention Management for Dynamic Software Transactional Memory. 24*th ACM Symp. on Principles of Distributed Computing*, July 2005.

[29] M. L. Scott, M. F. Spear, L. Dalessandro, and V. J. Marathe. Delaunay Triangulation with Transactions and Barriers. *IEEE Intl. Symp. on Workload Characterization*, September 2007.

[30] A. Shriraman, M. F. Spear, H. Hossain, S. Dwarkadas, and M. L. Scott. An Integrated Hardware-Software Approach to Flexible Transactional Memory. 34*th Intl. Symp. on Computer Architecture*, June 2007. TR 910, Dept. of Computer Science, Univ. of Rochester, December 2006.

[31] A. Shriraman, S. Dwarkadas, and M. L. Scott. Flexible Decoupled Transactional Memory Support. TR 925, Dept. of Computer Science, Univ. of Rochester, November 2007.

[32] M. F. Spear, V. J. Marathe, W. N. Scherer III, and M. L. Scott. Conflict Detection and Validation Strategies for Software Transactional Memory. 20*th Intl. Symp. on Distributed Computing*, September 2006.

[33] M. F. Spear, A. Shriraman, H. Hossain, S. Dwarkadas, and M. L. Scott. Alert-on-Update: A Communication Aid for Shared Memory Multiprocessors (poster paper). 12*th ACM Symp. on Principles and Practice of Parallel Programming*, March 2007.

[34] M. F. Spear, V. J. Marathe, L. Dalessandro, and M. L. Scott. Privatization Techniques for Software Transactional Memory. TR 915, Dept. of Computer Science, Univ. of Rochester, February 2007.

[35] Sun Microsystems Inc. OpenSPARC T2 Core Microarchitecture Specification. July 2005.

[36] L. Yen, J. Bobba, M. R. Marty, K. E. Moore, H. Valos, M. D. Hill, M. M. Swift, and D. A. Wood. LogTM-SE: Decoupling Hardware Transactional Memory from Caches. 13*th Intl. Symp. on High Performance. Computer Architecture*, February 2007.

[37] C. Zilles and L. Baugh. Extending Hardware Transactional Memory to Support Non-Busy Waiting and Non-Transactional Actions. 1*st ACM SIGPLAN Workshop on Transactional Computing*, June 2006.

SUMMARY OF THE INVENTION

It is an object of the invention to maintain the separation between version management and conflict management without the need for software-managed metadata.

It is another object of the invention to provide more fully decoupled hardware to maintain such separation.

To achieve the above and other objects, the present invention is directed to a FlexTM (FLEXible Transactional Memory) system that introduces conflict summary tables (CSTs) to concisely capture conflicts between transactions. It also uses Bloom filter signatures (as in Bulk and LogTM-SE) to track and summarize a transaction's read and write sets, and adapts the versioning system of RTM (programmable data isolation—PDI), extending it to directory-based coherence and adding a hardware-filled overflow mechanism.

Though FlexTM relies on read and write signatures to maintain CSTs, the signatures are first-class objects, and can be used for other purposes as well. The CSTs, for their part, can be polled by software or configured to trigger a user-level handler when conflicts occur; this allows us to separate conflict detection from conflict management. In other words, while the hardware always detects conflicts immediately, software chooses when to notice and what to do about it. FlexTM enables lazy conflict management without commit tokens, broadcast of write sets, or ticket-based serialization. It is, to our knowledge, the first hardware TM to implement lazy commits and aborts as entirely local operations, even with parallel commits in multiple threads.

As in RTM, PDI buffers speculative writes in local (private) caches, allowing those caches to grow incoherent under software control. Rather than fall back to software-only TM in the event of overflow, however, FlexTM moves evicted speculative lines to a thread-private overflow table (OT) in virtual memory. Both signatures and CSTs are independent of the versioning system.

Signatures, CSTs, and OTs are fully visible in software, and can be read and (at the OS level) written under software control. This allows us to virtualize these structures, extending transactions through context switches and paging. As in LogTM-SE, summary signatures capture the read and write sets of swapped-out transactions. However, because we flush speculative state from the local cache when descheduling a transaction, unlike LogTM-SE, the summary signature is not on the path of every L1 access, but rather, is checked only on a miss.

We have developed a 16-core FlexTM CMP prototype on the Simics/GEMS simulation framework. We investigate performance using benchmarks that stress the various components of the system and the policy decisions implemented in software. Our results suggest that FlexTM's performance is comparable to that of fixed policy HTMs, and 2× and 5× better than that of hardware accelerated STMs and plain STMs, respectively. The results also indicate that lazy conflict management (for which FlexTM is ideally suited) serves to maximize concurrency and encourages forward progress of TM applications. On the other hand, Eager detection tries to maximize overall system utilization in a mixed-programming environment. These results underscore the importance of hardware that permits such policy specifics to be controlled in software.

BRIEF DESCRIPTION OF THE DRAWING

A preferred embodiment of the present invention will be set forth in detail with reference to the drawings, in which.

DETAILED DESCRIPTION OF THE PREFERRED EMBODIMENT

Figures 1, 3:
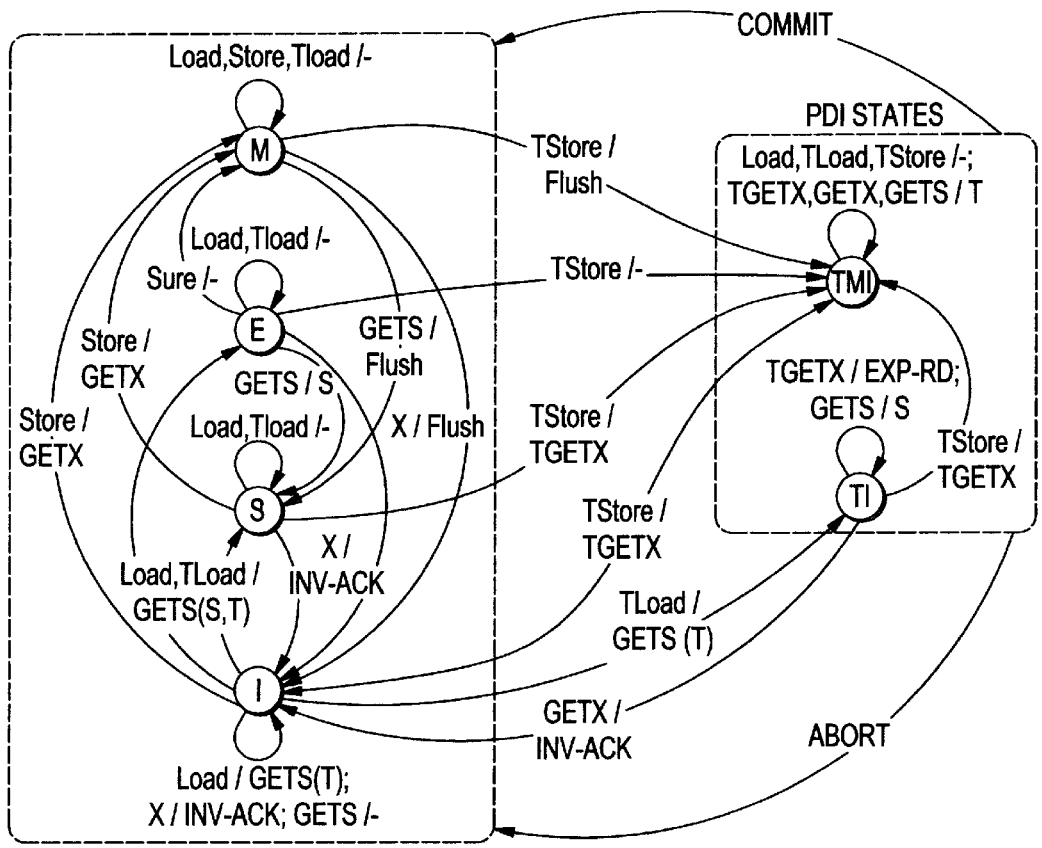
FIG. 1 is a state diagram showing the operation of the preferred embodiment.
FIG. 3 is a code listing of a commit routine for lazy transactions.

A preferred embodiment of the present invention will be set forth in detail with reference to the drawings, in which like reference numerals refer to like elements or steps throughout.

FlexTM provides hardware mechanisms for conflict detection, conflict management, and versioning. We first describe these separately, then discuss how they work together to enable flexible TM.

Access tracking, including read-set and write-set signatures, will now be described. Bulk and LogTM-SE use Bloom filter signatures to summarize the read and write sets of transactions in a concise but conservative fashion (i.e., false positives but no false negatives). Signatures decouple conflict detection from critical L1 tag arrays and enable remote requests to test for conflicts using local processor state, without walking in-memory structures. As in these systems, every FlexTM processor maintains a read signature ($R_{sig}$) and a write signature ($W_{sig}$) for the current transaction. The signatures are updated by the processor on transactional loads and stores. They allow the controller to detect conflicts when it receives a remote coherence request.

Conflict tracking uses conflict summary tables. Existing proposals for both eager and lazy conflict detection track information on a cacheline-by-cache-line basis. FlexTM, by contrast, tracks conflicts on a processor-by-processor basis (virtualized to thread-by-thread). Specifically, each processor has three Conflict Summary Tables (CSTs), each of which contains one bit for every other processor in the system. Named R-W, W-R, and W-W, the CSTs indicate that a local read (R) or write (W) has conflicted with a read or write (as suggested by the name) on the corresponding remote processor. On each coherence request, the controller reads the local $W_{sig}$ and $R_{sig}$, sets the local CSTs accordingly, and includes information in its response that allows the requestor to set its own CSTs to match.

Versioning support uses programmable data isolation. RTM proposed a lazy versioning protocol (programmable data isolation (PDI)) that allowed software to exploit incoherence (when desired) by utilizing the inherent buffering capabilities of private caches. Programs use explicit TLoad and TStore instructions to inform the hardware of transactional memory operations: TStore requests isolation of a speculative write, whose value will not propagate to other processors until commit time. TLoad allows local caching of (previous values of) remotely TStored lines.

FlexTM adapts PDI to a directory protocol and extends it to incorporate signatures and CSTs. It also simplifies the management of speculative reads, adding only two new stable states to the base MESI protocol, rather than the five employed in RTM. Details appear in FIG. 1. In that figure, dashed boxes enclose the MESI and PDI subsets of the state space. Notation on transitions is conventional: the part before the slash is the triggering message; after is the ancillary action ('–' means none). GETS indicates a request for a valid sharable copy; GETX for an exclusive copy; TGETX for a copy that can be speculatively updated with TStore. X stands for the set {GETX, TGETX}. "Flush" indicates a data block response to the requestor and directory. S indicates a Shared message; T a Threatened message. Plain, they indicate a response by the local processor to the remote requestor; parenthesized, they indicate the message that accompanies the response to a request. An overbar means logically "not signaled". The following tables will clarify FIG. 1:

State Encoding

| | MESI | | |
|---|---|---|---|
| | M bit | Vbit | T bit |
| M | 1 | 0 | 0 |
| E | 1 | 1 | 0 |
| S | 0 | 1 | 0 |
| I | 0 | 0 | 0 |
| TMI | 1 | 0 | 1 |
| TI | 0 | 0 | 1 |

Responses to requests that hit in $W_{sig}$ or $R_{sig}$

| Request Msg | Hit in $W_{sig}$ | Hit in $R_{sig}$ |
|---|---|---|
| GETX | Threatened | Invalidated |
| TGETX | Threatened | Exposed-Read |
| GETS | Threatened | Shared |

Requestor CST set on coherence message

| | Response Message | |
|---|---|---|
| Local op. | Threatened | Exposed-Read |
| TLoad | R-W | — |
| TStore | W-W | W-R |

Figure 2:
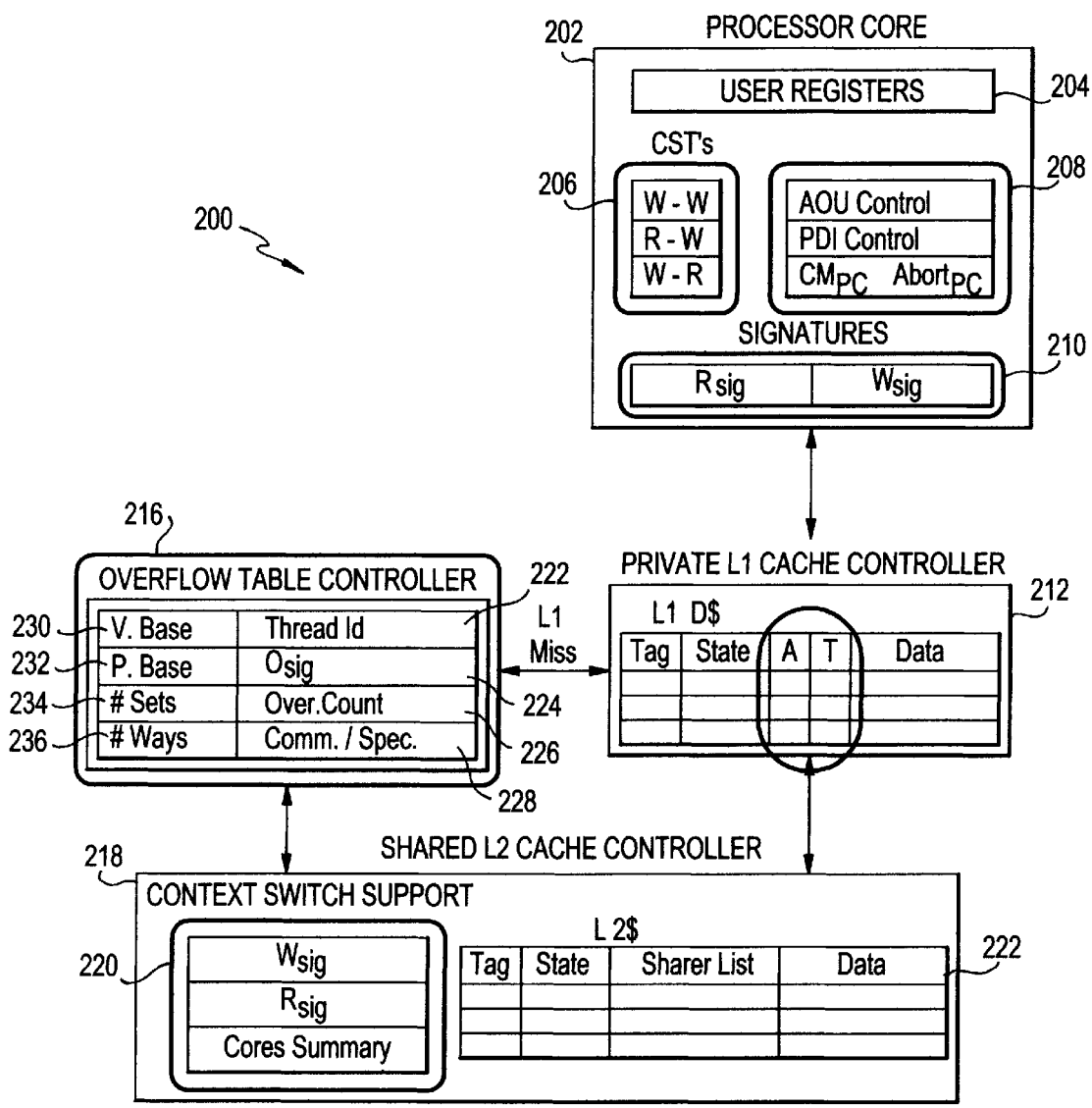
FIG. 2 is a schematic diagram showing an overview of the architecture of the preferred embodiment.

FIG. 2 shows an architecture overview of FlexTM. The dark lines surround FlexTM-specific components. The processor core 202 includes user registers 204; conflict tracking registers 206 for W-W conflicts, R-W conflicts, and W-R conflicts; conflict tracking registers 208 for AOU control, PDI control, $CM_{PC}$, and $Abort_{PC}$; and access tracking registers (signatures) 210 for $R_{sig}$ and $W_{sig}$. The private L1 cache controller 212 includes columns for tag, state, A, T and data. The overflow table controller 216 includes registers for thread ID, $O_{sig}$, base address, overflow count, hash parameters and committed/spec. The shared L2 cache controller 218 includes context switch support 220 for $WS_{sig}$, $RS_{sig}$ and cores summary, as well as a shared L2 cache 222.

FlexTM CMP's base cache protocol for private L1s and a shared L2 is an adaptation of the SGI ORIGIN 2000 directory-based MESI, with the directory maintained at the L2 tags (see FIG. 2). Local L1 controllers respond to both the directory and the requestor (response to the directory is used to indicate whether the cache line has been dropped or retained). Requestors make three different types of requests: GETS on a read (Load/TLoad) miss in order to get a copy of the data, GETX on a normal write (Store) miss/upgrade in order to get exclusive permissions as well as potentially an updated copy, and TGETX on a transactional store (TStore) miss/upgrade. GETX and TGETX represent either a request for data with exclusive access or an upgrade-to-exclusive message.

A TStore results in a transition to the TMI state in the private cache (encoded by setting the T bit and dirty bit in conventional MESI—see FIG. 2). A TMI line reverts to M on commit (propagating the speculative modifications) and to I on abort (discarding speculative values). On the first TStore to a line in M, TMESI writes back the modified line to L2 to ensure subsequent Loads get the latest non-speculative version. To the directory, the local TMI state is analogous to the conventional E state. The directory realizes that the processor can transition to M (silent upgrade) or I (silent eviction), and any data request needs to be forwarded to the processor to detect the latest state. The only modification required at the directory is the ability to support multiple owners. We accommodate this need by adding a mechanism similar to the existing support for multiple sharers. We track owners when they issue a TGETX request and ping all of them on other requests. In response to any remote request for a TMI line, the local L1 controller sends a Threatened response, analogous to the Shared response to a GETS request on an S or E line. In addition to transitioning the cache line to TMI, a TStore also updates the $W_{sig}$. TLoad likewise updates the $R_{sig}$.

TLoads when threatened move to the TI state (encoded by setting the T bit when in the I (invalid) state). (Note that a TLoad from E or S can never be threatened; the remote transition to TMI would have moved the line to I.) TI lines must revert to I on commit or abort, because if a remote processor commits its speculative TMI block, the local copy could go stale. The TI state appears as a conventional sharer to the directory.

On forwarded L1 requests from the directory, the local cache controller tests the signatures and appends the appropriate message type to the response message. On a miss in the $W_{sig}$, the result from testing the $R_{sig}$ is used; on a miss in both, the L1 cache responds as in normal MESI. The local controller also piggybacks a data response if its deemed necessary (M state). Signature-based response types are shown in FIG. 1. Threatened indicates a write conflict (hit in the $W_{sig}$), Exposed-Read indicates a read conflict (hit in the $R_{sig}$), and Shared or Invalidated indicate no conflict. When it sends a Threatened or Exposed-Read message, a responder B sets the bit corresponding to the requestor in its R-W, W-W, or W-R CSTs, as appropriate. The requestor likewise sets the bit corresponding to the responder in its own CSTs, as appropriate, when it receives the response.

Transaction commit is requested with a special variant of the CAS (compare-and-swap) instruction. If a CAS-Commit succeeds, the controller simultaneously reverts all local TMI and TI lines to M and I, respectively (achieved by flash clearing the T bits); if the CAS-Commit fails, the controller reverts all such lines to I (achieved by conditionally clearing the M bits based on the T bits and then flash clearing the T bits).

FlexTM enforces the single-writer or multiple-reader invariant for non-transactional lines. For transactional lines, FlexTM also enforces (1) TStores can only update lines in TMI state and (2) TLoads that are threatened can only cache the block in TI state. Software is expected to ensure that at most one of the conflicting transactions commits. It can restore coherence to the system by triggering an Abort on the remote transaction's cache, without having to re-acquire exclusive access to store sets like other lazy systems.

The Alert-On-Update (AOU) mechanism, borrowed from RTM, provides fast and flexible notification of conflicts. To use AOU, a program marks (ALoads) one or more cache lines, and the cache controller effects a subroutine call to a user-specified handler if the marked line is invalidated. Alert traps require simple additions to the processor pipeline. Modern processors already include trap signals between the Load-Store-Unit (LSU) and Trap-Logic-Unit (TLU). AOU adds an extra message to this interface and an extra mark bit, 'A', to each line in the L1 cache. (An overview of the FlexTM hardware required in the processor core, the L1 controller, and the L2 controller appears in FIG. 2.) RTM used AOU both to detect changes to transaction status words (initiated by conflict managers) and to perform conflict detection on metadata associated with objects accessed in the transaction. FlexTM uses AOU for the transaction status word only in order to obtain immediate notification of aborts performed by conflict management (it uses signatures and CSTs for conflict detection). Hence, FlexTM requires AOU support for only one cache line (i.e., the status word of the transaction, as described below) and can therefore use simplified hardware mechanism (avoiding the bit per cache tag). More general AOU support might still be useful for non-transactional purposes.

A programming model will now be disclosed. A FlexTM transaction is delimited by BEGIN_TRANSACTION and END_TRANSACTION macros. The first of these establishes conflict and abort handlers for the transaction, checkpoints the processor registers, configures per-transaction metadata, sets the transaction status word to active, and ALoads that word (for notification of aborts). The second macro aborts conflicting transactions and tries to atomically update the status word from active to committed using CAS-Commit. In this disclosure, we have adopted the subsumption model for nesting with support for transactional pause and restart.

Within a transaction, a processor issues TLoads and TStores when it expects transactional semantics, and conventional loads and stores when it wishes to bypass those semantics. While one could imagine requiring the compiler to generate instructions as appropriate, our prototype implementation follows typical HTM practice and interprets ordinary loads and stores as TLoads and TStores when they occur within a transaction. This convention facilitates code sharing between transactional and nontransactional program fragments. Ordinary loads and stores can be requested within a transaction by issuing special instructions; while not needed in our experiments, these could be used to implement open nesting, update software metadata, or reduce the cost of thread-private updates in transactions that overflow cache resources (described below).

As captured implicitly in FIG. 1, transactional and ordinary loads and stores to the same location can occur concurrently. While we are disinclined to require strong isolation as part of the user programming model (it is hard to implement on legacy hardware, and is of questionable value to the programmer), it can be supported at essentially no cost in HTM systems (FlexTM among them), and we see no harm in providing it. If the GETX request resulting from a nontransactional write miss hits in the responder's $R_{sig}$ or $W_{sig}$, it aborts the responder's transaction, so the nontransactional write appears to serialize before the (retried) transaction. A nontransactional read, likewise, serializes before any concurrent transactions, because transactional writes remain invisible to remote processors until commit time (in order to enforce coherence, the corresponding cache line, which is threatened in the response, is uncached).

We will now focus on bounded transactions (those that fit in the L1 cache and complete within an OS quantum); we will later describe OS and hardware extensions to support unboundedness. Every FlexTM transaction is represented by a software descriptor (Table 1) containing, among other fields, the transaction status word (TSW).

TABLE 1

Transaction Descriptor contents.

| Name | Description |
|---|---|
| TSW | active/committed/aborted |
| State | running/suspended |
| $W_{sig}$, $R_{sig}$ | Signatures |
| R-W, W-R, W-W | Conflict Summary Tables |
| OT | Pointer to Overflow Table descriptor |
| $Abort_{PC}$ | Handler address for AOU on TSW |
| $CM_{PC}$ | Handler address for Eager conflicts |
| E/L | Eager(1)/Lazy(0) conflict detection |

Transactions of a given application can operate in either Eager or Lazy conflict detection mode. In Eager mode, when conflicts appear through response messages (i.e., Threatened and Exposed-Read), the processor effects a subroutine call to the handler specified by CMPC. The conflict manager either stalls the requesting transaction or aborts one of the transactions (lines 1-5 in FIG. 3). The remote transaction can be aborted by atomically updating its TSW from active to aborted, thereby triggering an alert (since the TSW is always ALoaded). Other eager conflict management systems provide no way to abort remote transactions. In eager mode, when a transaction reaches its commit point, its CSTs will be empty since all prior conflicts will have been resolved. A transaction attempts to commit by executing a CAS-Commit to its TSW. If the CAS-Commit succeeds in replacing the expected old value (e.g., active) with the desired new value (e.g., committed), the hardware flash-commits all locally buffered (TMI) state. The CAS-Commit will fail if the local W-R or W-W CST is not zero.

In Lazy mode, transactions are not alerted into the conflict manager. The hardware simply updates requestor and responder CSTs. At commit time, a transaction T needs to abort only the transactions found in its W-R and W-W sets in order to ensure serialization. No tokens, broadcast of store sets, or ticket-based serialization are required. To avoid spurious aborts, T may also clean itself out of X's W-R, where X is the transaction in T's R-W. Lazy transactions employ the Commit( ) routine shown in FIG. 3. Eager transactions manage conflicts as soon as they are detected and only need to CAS-Commit their TSW to committed in Commit( ).

All of the work for the Commit( ) routine occurs in software, with no need for global arbitration, blocking of other transactions, or special hardware states. Lazy Commit( ) uses a copy and clear instruction (similar to, e.g., clruw on the SPARC) to atomically access its own W-R and W-W. In lines 2-5 of FIG. 3, for each of the bits that was set, transaction T aborts the corresponding transaction R by atomically changing R's TSW from active to aborted. Transaction R, of course, could try to CAS-Commit its TSW and race with T, but since both operations occur on R's TSW, conventional cache coherence guarantees serialization. After T has successfully aborted all conflicting peers, it performs a CAS-Commit on its own status word. If the CAS-Commit fails and the failure can be attributed to a non-zero W-R or W-W (i.e., new conflicts), the Commit( ) routine is restarted.

For common case transactions that do not overflow the cache, FlexTM uses the buffering capabilities (PDI support) of the cache without requiring any extra logging or software overhead. The read-write signatures and conflict summary table help eliminate the software overheads of indirection typically incurred by STM systems, while retaining/enabling policy flexibility.

To provide the illusion of unbounded space to transactions, the underlying system needs to support transactions in the presence of (1) L1 cache overflows and (2) physical memory virtualization (i.e., paging).

Cache evictions must be handled carefully in FlexTM. First, signatures rely on forwarded requests from the directory to trigger lookups and provide conservative conflict hints (Threatened and Exposed-Read messages). Second, TMI lines holding speculative values need to be buffered and cannot be merged into the shared level of the cache.

Conventional MESI performs silent eviction of E and S lines, to avoid the bandwidth overhead of notifying the directory. In FlexTM, silent evictions of E, S, and TI lines also serve to ensure that a processor continues to receive the coherence requests it needs to detect conflicts. (Directory information is updated only in the wake of L1 responses to L2 requests, at which point any conflict is sure to have been noticed.) When evicting a cache block in M, FlexTM updates the L2 copy but does not change the directory state. Processor sharer information can be lost due to L2 evictions. To preserve the access conflict tracking mechanism, L2 misses result in querying all L1 signatures in order to recreate the sharer list. This mechanism behaves much like the sticky bits used in LogTM.

FlexTM employs a per-thread overflow table (OT) to buffer evicted TMI lines. The OT is organized in virtual memory in a manner similar to tagged memories in COMA and remote-address-caches. It is accessed both by software and by the L1 cache controller. The latter implements fast lookups on cache misses, allowing software to be oblivious to the overflowed status of a cache line, and fast cleanup and atomic commit of overflowed state.

The controller registers required for OT support appear in FIG. 2 as 216. They include a thread identifier 222, a signature (Osig) 224 for the overflowed cache lines, a count 226 of the number of such lines, a committed/speculative flag 228, and parameters (virtual base address 230, physical base address 232, number of sets in overflow table 234, and number of ways in overflow table 236) used to index into the table.

On the first overflow of a TMI cache line, the processor traps to a handler, which allocates an OT, fills the registers in the L1 cache controller, and returns control to the transaction. We assume the OS ensures that OTs of active transactions lie in physically contiguous memory. If an active transaction's OT is swapped out, then the OS invalidates the Base-Address register in the controller. If subsequent activity requires the OT, then the hardware traps to a software routine that establishes a re-mapping, taking care that TMI lines aren't evicted (the L1 cache controller could easily support this routine by ensuring at least one entry in the set is free for non-TMI lines.) On any subsequent TMI eviction, the cache controller calculates the set index using the physical address of the line, accesses the set tags of the OT region to find an empty way, and writes the data block back to the OT instead of the L2. The controller tags the line with both its physical address (used for associative lookup) and its logical address (used to accommodate page-in at commit time; see below). The controller also adds the physical address to the overflow signature (Osig) and increments the overflow count.

The Osig provides quick lookaside checks for entries in the OT. Reads and writes that miss in the L1 are checked against the signature. On hits, they fetch the line from the OT and invalidate the OT entry. Misses are forwarded to the L2. Remote requests need to check only committed OTs (since speculative lines are private) and for only a brief span of time (during OT copy-back). When a remote request hits in the Osig of a committed transaction, the controller could perform lookup in the OT, much as it does for local requests, or it could NACK the request until copy-back completes. Our current implementation does the latter.

In addition to functions previously described, the CAS-Commit operation sets the Committed bit in the controller's OT state. This indicates that the OT content should be visible, activating NACKs or lookups. At the same time, the controller initiates a micro-coded copy-back operation. Note that there are no constraints on the order in which lines from the OT are copied back to their natural locations. This stands in contrast to time-based logs, which must proceed in reverse order (for undo logs) of insertion. On aborts, the OT is returned to the operating system. The next overflowed transaction allocates a new OT. When an OT overflows a way, the hardware generates a trap to the OS, which expands the OT appropriately.

With the addition of the overflow table controller, software is involved only for the allocation and deallocation of the OT structure. Indirection to the OT on misses, while unavoidable, is performed in hardware rather than in software, thereby reducing the resulting overheads. Furthermore, FlexTM's copyback is performed by the controller and occurs in parallel with other useful work on the processor.

Virtual memory paging will now be described. Though presumably infrequent, page faults may nonetheless occur in the middle of a transaction. To accommodate paging, OT tags include both logical and physical addresses. The physical addresses are used for associative lookup, and to eliminate synonym and homonym problems. The logical addresses are used during copy-back, to ensure automatic page-in of any nonresident pages. Though for simplicity we currently require that OTs be physically contiguous, they can themselves be paged, albeit as a single unit. In particular, it makes sense for the OS to swap out the OTs of de-scheduled threads. A more ambitious FlexTM design could allow physically non-contiguous OTs, with controller access mediated by more complex mapping information.

The only two challenges left to consider are (1) when a logical page is swapped out and its physical frame is reused for a different page in the application, and (2) when a logical page is re-mapped to a different physical frame. Since signatures are built using physical addresses (1) can only lead to false positives, which can cause spurious aborts. For (2) we adapt a solution first proposed in LogTM-SE. At the time of the unmap, active transactions are interrupted both for TLB entry shootdown (already required) and to flush TMI lines to the OT. When the page is assigned to a new frame, the OS interrupts all the threads that mapped the page and tests each thread's $R_{sig}$, $W_{sig}$, and $O_{sig}$ for the old address of each block. If the block is present, the new address is inserted into the signatures. The corresponding tags of the OT entries are also updated with the new physical address.

Context switch support will now be described. STMs provide effective virtualization support because they maintain conflict detection and versioning state in virtualizable locations and use software routines to manipulate them. For common case transactions, FlexTM uses scalable hardware support to bookkeep the state associated with access permissions, conflicts, and versioning while controlling policy in software. In the presence of context switches, FlexTM separates the transactional state of an application from the hardware and manages it in software. This enables support for transactions to extend across context switches (i.e., to be unbounded in time).

To track the accesses of descheduled threads, FlexTM maintains two summary signatures, $RS_{sig}$ and $WS_{sig}$, at the directory of the system. When suspending a thread in the middle of a transaction, the OS unions (i.e., ORs) the signatures ($R_{sig}$ and $W_{sig}$) of the thread into the current $RS_{sig}$ and $WS_{sig}$ installed at the directory. FlexTM updates $RS_{sig}$ and $WS_{sig}$ using a Sig message. The Sig message uses the coherence L1 request network and carries the processor's $R_{sig}$ and $W_{sig}$. The directory updates the summary signatures and ACKs on the forwarding network. This avoids races between the ACK and remote requests that were forwarded before the summary signature was updated.

Following this the OS scheduler invoke routines to merge the current transaction's hardware state into the process's virtual memory. This hardware state consists of (1) the TMI lines in the local cache, (2) the OT registers, (3) the current $R_{sig}$ and $W_{sig}$, and (4) the CSTs. After saving this state (in the order shown), the OS issues an abort instruction, causing the cache controller to revert all TMI and TI lines to I, and to clear the signatures, CSTs, and OT registers. This ensures that any subsequent conflicting access will miss in the private cache and generate a directory request. In other words, for any given location, the first conflict between the running thread and a descheduled thread always results in a miss in the private cache. The L2 controller consults the summary signatures on each L1 miss, and traps to software on the requesting processor when a conflict is detected.

The software handler mimics hardware operations on a per-thread basis, testing signature membership and updating the CSTs of suspended transactions. No special instructions are required, since the CSTs and signatures of the de-scheduled conflicting thread are all visible in virtual memory. Nevertheless, updates need to be performed atomically to ensure consistency when multiple active transactions conflict with a common de-scheduled transaction and update the CSTs concurrently. To support the handler's operations, the OS maintains a global conflict management table (CMT), indexed by processor id, with the following invariant: if transaction T is active, and executed on processor P when in the transaction, irrespective of the state of the thread (suspended/running), the transaction descriptor will be included in the active transaction list corresponding to processor P. The handler uses the processor ids in its CST to index into the CMT and to iterate through transaction descriptors, testing the saved signatures for conflicts, updating the saved CSTs (if running in lazy mode), or invoking conflict management (if running in eager mode). Similar perusal of the CMT occurs at commit time if running in lazy mode. As always, we abort a transaction by writing its TSW. If the remote transaction is running, an alert is triggered since it would have previously ALoaded its TSW. If suspended, the OS virtualizes the AOU operation by causing the transaction to wake up in a software specified handler that checks the TSW and re-ALoads it if still active.

When re-scheduling a thread, if the thread is being scheduled back to the same processor from which it was swapped out, the thread's $R_{sig}$, $W_{sig}$, CST, and OT registers are restored on the processor. The OS then re-calculates the summary signatures for the currently swapped out threads with active transactions and re-installs them at the directory. Thread migration is a little more complex, since FlexTM performs lazy versioning and does not re-acquire ownership of previously written cache lines. To avoid the inherent complexity, FlexTM adopts a simple policy for migration: abort and restart.

Along with $RS_{sig}$ and $WS_{sig}$, the directory maintains a bitmap indicating the processors on which transactions are currently de-scheduled (the "Cores Summary" register in FIG. 2). When the directory would normally remove a processor from the sharers list (because a response to a coherence request indicates that the line is no longer cached), the directory refrains from doing so if the processor is in the Cores Summary list and the line hits in $RS_{sig}$ or $WS_{sig}$. This ensures that the L1 continues to receive coherence messages for lines accessed by de-scheduled transactions. It will need these messages if the thread is swapped back in, even if it never reloads the line.

Unlike LogTM-SE, FlexTM is able to place the summary signature at the directory rather than on the path of every L1 access, thereby avoiding the need for inter-processor interrupts to install summary signatures. Since speculative state is flushed from the local cache when descheduling a transaction, after a transaction is scheduled back in, the first access to a conflicting line is guaranteed to miss, and the conflict will be caught by the summary signature at the directory. Furthermore, LogTM-SE does not provide mechanisms to abort remote transactions, and this could lead to convoying of running transactions behind suspended transactions.

Complexity analysis will now be considered. We quantify the area overhead of FlexTM and comment on its level of design complexity. Area estimates appear in Table 2. We consider processors from a uniform (65 nm) technology generation to better understand microarchitectural tradeoffs. To simplify the analysis we consider only those add-ons required at the processor core: $R_{sig}$ and $W_{sig}$, CSTs, cache state bits, and the OT controller. Requirements at the L2 level should be less cost and performance-critical, and no more onerous.

TABLE 2

Area estimates

| Processor | Merom | Power6 | Niagara-2 |
| --- | --- | --- | --- |
| Actual Die | | | |
| SMT (threads) | 1 | 2 | 8 |
| Core (mm$^2$) | 31.5 | 53 | 11.7 |
| L1 D (mm$^2$) | 1.8 | 2.6 | 0.4 |
| CACTI Prediction | | | |
| $R_{sig}$ + $W_{sig}$ (mm$^2$) | .033 | .066 | 0.26 |
| $RS_{sig}$ + $WS_{sig}$ (mm$^2$) | .033 | .033 | 0.033 |
| CSTs (registers) | 3 | 6 | 24 |
| OT controller (mm$^2$) | 0.16 | 0.24 | 0.035 |
| Extra state bits | 2(T, A) | 3(T, A, ID) | 5(T, A, ID) |
| % Core increase | 0.6% | 0.59% | 2.6% |
| % L1 Dcache increase | 0.35% | 0.29% | 3.9% |

Processor component sizes were estimated using published die images. FlexTM component areas were estimated using CACTI 6.

The signatures are 2048 bits wide and 4-banked, with separate read and write ports. CACTI indicates that these should be readable and writable in less than the L1 access latency.

Cache line ID bits are required to identify the hardware context that wrote a TMI line (e.g., 3 for Niagara-2's 8-way SMT). State bit overhead includes the transistor per bit required to support flash-clearing.

The OT controllers have been designed to handle 8 writebacks and 8 miss requests from the L1 cache. The buffer entries are sized based on the line size of the L1 cache.

FlexTM shares its signature design with Bulk, LogTM-SE, and SigTM. Only for the 8-way multithreaded Niagara-2 do these have a noticeable area impact: 2.2%; on Merom and Power6 they add only ~0.1%. The CSTs for their part are full-map hit-vector registers (as wide as the number of processors), with three per hardware context. FlexTM adds two state bits ('A' and 'T') to each cache line, plus ID bits on an SMT to identify the owner of a TMI cache line. We do not expect the extra bits to affect the latency of the L1 cache because (a) they have minimal impact on the L1 area (less than 4% on Niagara-2, well under 1% on Merom and Power6), and (b) the state array is typically accessed in parallel with the higher latency data array. For the uncommon overflow case, the OT controller adds less than 0.5% to core area. Its FSM is very similar to the existing translation storage buffer (TSB) walker in Niagara-2; the dominant sub-structures are the buffers and MSHRs required to interface with the L1 and L2.

To conclude, FlexTM's add-ons have noticeable area impact (~2.6%) only in the case of high core multithreading (e.g., Niagara-2's 8-way SMT) with small caches lines. The overheads imposed on out-of-order CMP cores (Merom and Power6) are well under 1%. These overheads seem particularly small given that FlexTM makes a number of important contributions towards supporting redo-logging and lazy conflict management without embedding policy in hardware. First, CSTs enable commit/abort management (for eager or lazy conflict management) to occur entirely locally, and enable transactions to commit in parallel. Previously, systems that exploited cache incoherence either required elaborate commit protocols (e.g., TCC and Bulk) or high overhead software bookkeeping (e.g., RTM-F). Second, AOU makes it easy to implement a variety of conflict management policies, including those that abort remote peers. Both LogTMSE and SigTM support only self-aborts, and limit conflict management policies.

Perhaps most important, PDI allows caches to hold speculative updates in the common case (i.e., no overflow) and removes redo-log insertion from the critical path. The OT controller streamlines the commit path even for overflow transactions, and overlaps the physical commit with subsequent real work. Both LogTMSE and SigTM require log updates on the critical path (possibly every speculative write) and consume extra L1 bandwidth for these writes even for transactions that don't overflow.

Performance of the preferred embodiment will now be disclosed. We evaluate FlexTM through full system simulation of a 16-way chip multiprocessor (CMP) with private L1 caches and a shared L2 (see Table 3(a)), on the GEMS/Simics infrastructure. We added support for the FlexTM instructions using the standard Simics "magic instruction" interface. Our base protocol is an adaptation of the SGI ORIGIN 2000 for a CMP, extended to support FlexTM's requirements: (1) the alert-on-update mechanism, (2) programmable-data-isolation, and (3) signatures and conflict summary tables. Software routines (setjmp) were used to checkpoint registers.

Simics allows us to run an unmodified Solaris 9 kernel. Simics also provides a "user-mode-change" and "exception-handler" interface, which we use to trap user-kernel mode crossings. On crossings, we suspend the current transaction mode and allow the OS to handle TLB misses, register-window overflow, and other kernel activities required by an active user context in the midst of a transaction. On transfer back from the kernel, we deliver any alert signals received during the kernel routine, triggering the alert handler if needed.

We evaluate FlexTM using the seven benchmarks described in Table 3(b). In the data-structure tests, we execute a fixed number of transactions in a single thread to warm-up the data structure, then fork off threads to perform the timed transactions. Workload set I (WS1) interfaces with three TM systems: (1) FlexTM, (2) RTM-F, a hardware accelerated STM system, and (3) RSTM, a non-blocking STM for legacy hardware (configured to use invisible readers, with self validation for conflict detection). Workload-Set 2 (WS2) interfaces with two TM systems: (1) FlexTM and (2) TL-2, a blocking STM for legacy hardware. We use the same conflict manager (Polka) across all systems. While all runtime systems execute on our simulated hardware, RSTM and TL-2 make no use of FlexTM extensions. RTM-F uses only AOU and PDI. FlexTM uses all the presented mechanisms.

TABLE 3(a)

| 16-way CMP, Private L1, Shared L2 | |
|---|---|
| Processor Cores | 16 1.2 GHz in-order, single issue, non-memory IPC = 1 |
| L1 Cache | 32 KB 2-way split, 64-byte blocks, 1 cycle latency, 32 entry victim buffer, 2 Kbit signature |
| L2 Cache | 8 MB, 8-way, 4 banks, 64-byte blocks, 20 cycle |
| Memory | 2 GB, 250 cycle latency |
| Interconnect | 4-ary tree, 1 cycle latency, 64-byte links Central Arbiter |
| Arbiter Latency | 30 cycles |
| Commit Message latency | 16 cycles/link |

TABLE 3(b)

Workload-Set 1

HashTable: Transactions attempt to lookup, insert, or delete (33% each) a value (range 0 . . . 255) with equal probability into a hash table with 256 buckets and overflow chains.
RBTree: Transactions attempt to insert, remove, or delete (33% each) values in the range 0 . . . 4095 with equal probability. At steady state there are about 2048 objects, with 50% of the values in leaves. Node size is 256 bytes.
LFUCache: Simulates a web cache using a large (2048) array based index and a smaller (255 entry) priority queue to track the page access frequency. Pages to be accessed are randomly chosen using a Zipf distribution: $p(i) \propto_C \Sigma_{0<j\leq i} i^{-2}$
RandomGraph Transactions insert or delete vertices (50% each) in an undirected graph represented with adjacency lists. Edges are chosen at random, with each new vertex initially having up to 4 randomly selected neighbors.
Delaunay: Solves the original triangulation problem. Sorts the points into geometric regions, em-ploys sequential solvers in parallel to triangulate the regions, then uses transactions to "stitch" together the seams.

Workload-Set 2

Vacation: Implements a travel reservations system. Client threads interact with an in-memory database in which tables are implemented as a Red-Black tree. This workload is similar in design to SPECjbb2000. We configure the workload in two contention modes:
Low - 90% of relations queried, read-only tasks dominate;
High - 10% of relations queried, 50-50 mix of read-only and read-write tasks.

Result 1a: Separable hardware support for conflict detection, conflict management, and versioning can provide significant acceleration for software controlled TMs; eliminating software bookkeeping from the common case critical path is essential to realize the full benefits of hardware acceleration.

Result 1b: CSTs are an important optimization: even when transactions conflict, the number of transactions that conflict with any given transaction is less than the total number of transactions active in the system.

Figure 4:
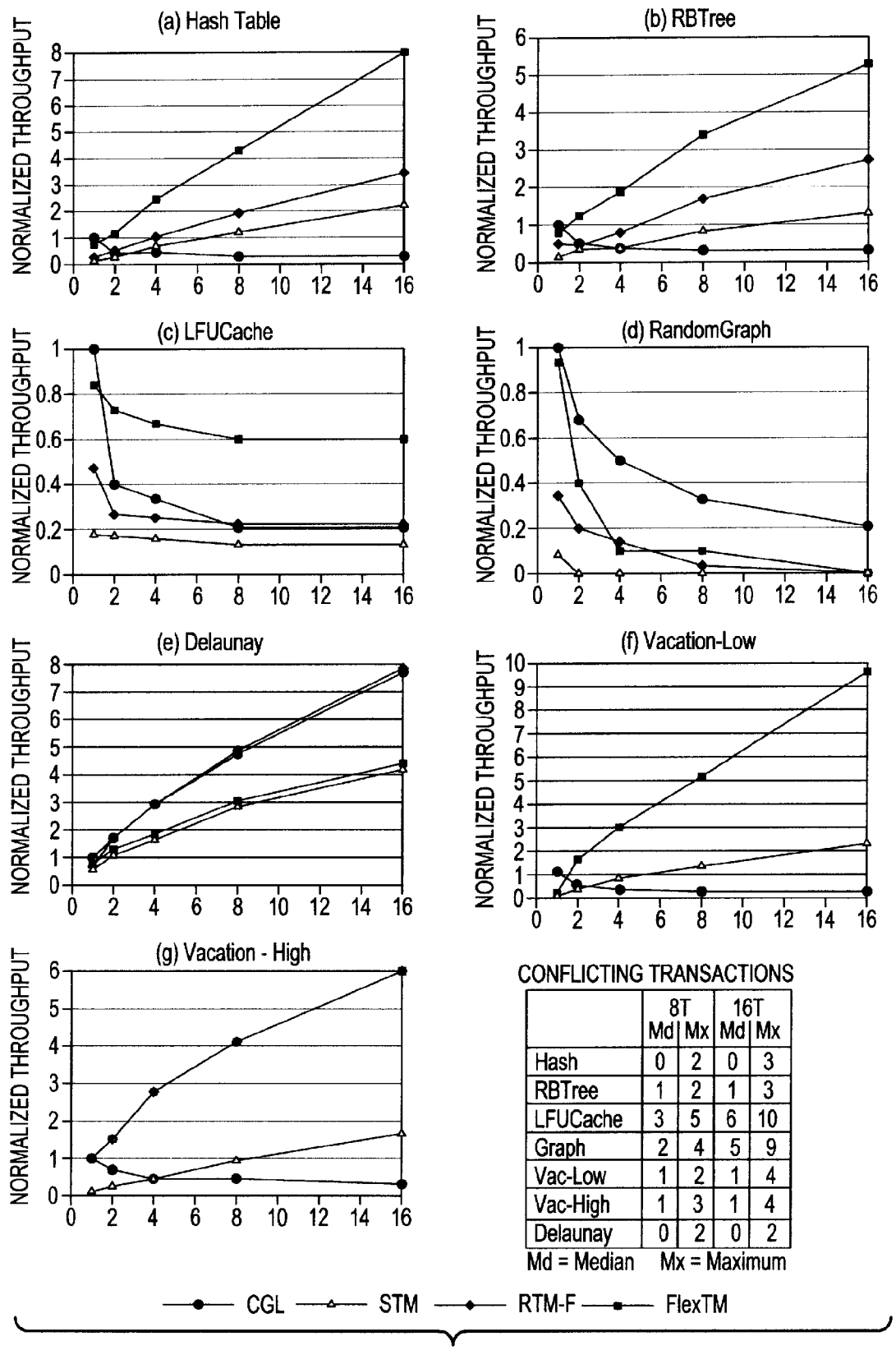
FIG. 4 shows throughput normalized to 1-thread CGL as a function of the number of threads.

FIG. 4 shows normalized throughput (transactions/sec) and scalability across our applications and runtime systems. FlexTM, RTM-F, and RSTM have all been set up to perform eager conflict management (TL-2 is inherently lazy). Throughput is normalized to that of single-thread coarse-grain-locks (CGL), which is very close to sequential thread performance. In each plot the x-axis specifies the number of threads. In plots (a)-(e), STM represents RSTM; in (f)-(g) it represents TL2. To illustrate the usefulness of CSTs (see the table in FIG. 4), we also report the number of conflicts encountered and resolved by an average transaction—the number of bits set in the W-R and W-W CST registers.

STM performance suffers from the bookkeeping required to track data versions (copying), detect conflicts, and guarantee a consistent view of memory (validation). RTM-F exploits AOU and PDI to eliminate copying and validation but still incurs bookkeeping overhead amounting to 40-50% of execution time. For single-thread runs, RTM-F achieves a speedup of 3.5× over RSTM, but at higher threads, bookkeeping limits the speedup to ~2×. FlexTM's hardware tracks conflicts, buffers speculative state, and fetches the buffered data transparent to software. FlexTM's main overhead, register checkpointing, involves spilling of local registers into the stack and is nearly constant across thread levels. Eliminating peraccess software overheads (metadata tracking, validation, and copying) allows FlexTM to realize the full potential of hardware acceleration, with an average speedup of 2× over RTM-F, 5.5× over RSTM, and 4.5× over TL2.

HashTable and RBTree both scale well. In RSTM, validation and copying account for 22% of execution time in HashTable and 50% in RBTree; metadata management accounts for 40% and 30%, respectively.

Tree rebalancing in RBTree is non-trivial: insertion proceeds bottom-up while searching moves top-down. At higher thread levels, eager conflict management precludes read-write sharing and increases the likelihood of aborts, though the back-off strategy of the Polka conflict manager limits aborts to about 10% of total transactions committed.

LFUCache and RandomGraph do not scale. Conflict for popular keys in the Zipf distribution forces transactions in LFUCache to serialize. Stalled writers lead to extra aborts with larger numbers of threads, but performance eventually stabilizes for all TM systems. In RandomGraph, larger numbers of more random conflicts cause all TM systems to livelock at higher thread levels, due to eager contention management. The average RandomGraph transaction reads ~80 cache lines and writes ~15. In RSTM, read-set validation accounts for 80% of execution time. RTM-F eliminates this overhead, after which per-access bookkeeping accounts for 60% of execution time. FlexTM eliminates this overhead as well, to achieve 2.7× the performance of RTM-F at 1 thread. At higher thread levels, all TM systems livelock due to eager conflict management. In the language of Bobba et al., RandomGraph suffers from the FriendlyFire, FutileStall, and DuellingUpgrade pathologies.

Delaunay is fundamentally data parallel (less than 5% of execution time is spent in transactions) and memory bandwidth limited. FlexTM and CGL track closely out to 16 threads. RSTM and RTM-F also track closely, but at half the throughput, because the extra indirection required for metadata bookkeeping induces a ~2× increase in the number of cache misses.

Vacation as written is incompatible with the object-based API of RSTM and RTM-F. We therefore evaluate its performance on CGL, word-based TL2, and Flex-TM. Transactions read ~100 entries from a database and stream them through a RBTree. TL-2 suffers from the bookkeeping required prior to the first read (i.e., for checking write sets), for post-read validation, and at commit time. FlexTM avoids this bookkeeping, yielding 4× the performance of TL-2 at 1 thread. Low contention Vacation-low displays good scalability (FIG. 4f)—10×CGL's performance at 16 threads. Vacation-high displays less scalability (FIG. 4g): at 16 threads it attains 6× the performance of CGL. Multiple threads introduce (1) a mix of read-only (e.g., ticket lookups) and read-write (e.g., ticket reservation) tasks and (2) sets of dueling transactions that try to rotate common sub-tree nodes. These lead to an increase in the level of conflicts and aborts.

As shown in the table at the end of FIG. 4, the number of conflicts encountered by a transaction is small compared to the total number of transactions in the system. Even in workloads that have a large number of conflicts (LFUCache and RandomGraph) a typical transaction encounters only 30% of total transactions as conflicts. Scalable workloads (e.g., HashTable and Vacation) encounter essentially no conflict. This clearly suggests that global arbitration and serialized commits will not only waste bandwidth but also restrict concurrency. FlexTM's CSTs permit local arbitration and parallel commits, thereby unlocking the full concurrency potential of the application.

In the event of an overflow, FlexTM buffers the new values in a redo-log and needs to perform copy-update at commit-time. Almost all of our benchmark use the overflow mechanism sparingly, with a maximum of up to 5 cache lines overflowed in RandomGraph. Because our benchmarks have small write sets, cache set conflicts account for all cases of overflow. In separate experiments, we extended the L1 with an unbounded victim buffer. In applications with overflows, we found that redo-logging reduced performance by an average of 7% and a maximum of 13% (in RandomGraph) compared to the ideal case, mainly because re-starting transactions have their accesses queued behind the committed transaction's copy-back phase. As expected, benchmarks that don't overflow the cache (e.g., Hash) don't experience any slowdown.

Result 2: CSTs are useful: transactions don't conflict and even when they do the number of conflicts per transaction is less than the total active transactions. FlexTM's distributed commit demonstrates better scalability than a centralized arbiter.

As shown in the table at the end of FIG. 4, the number of conflicts encountered by a transaction is small compared to the total number of transactions in the system. Even in workloads that have a large number of conflicts (LFUCache and Random-Graph) a typical transaction encounters only 30% of total transactions as conflicts. Scalable workloads (e.g., HashTable and Vacation) encounter essentially no conflict. This clearly suggests that global arbitration and serialized commits will not only waste bandwidth but also restrict concurrency. CSTs enable local arbitration and the distributed commit protocol allows parallel commits thereby unlocking the full concurrency potential of the application.

Figure 5:
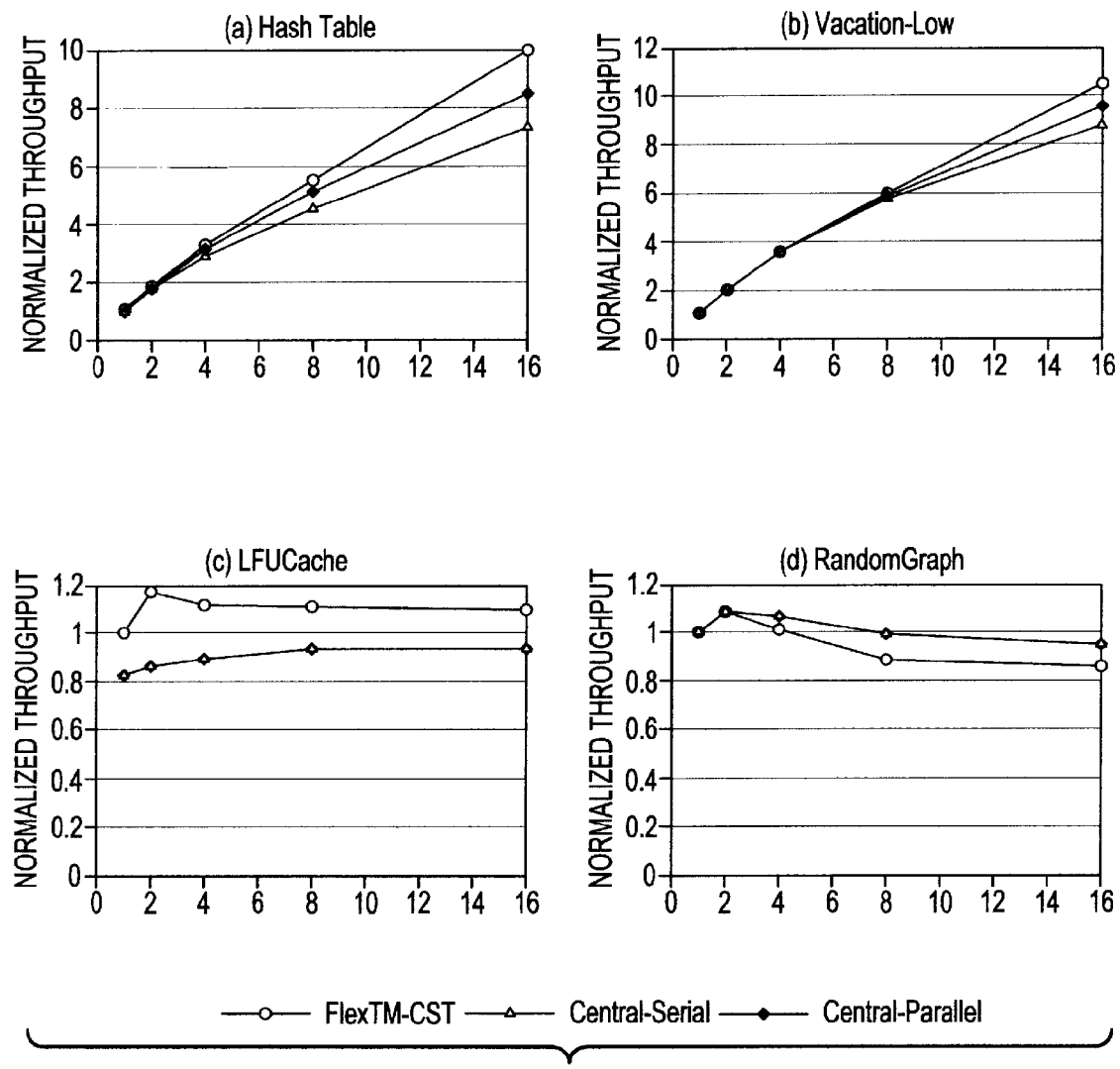
FIG. 5 shows performance of the preferred embodiment vs. centralized hardware arbiters.

In this set of experiments (FIG. 5), we compare FlexTM's distributed commit against two schemes with centralized hardware arbiters: Central-Serial and Central-Parallel. In both schemes, instead of using CSTs and requiring each transaction to ALoad its TSW, transactions forward their $R_{sig}$ and $W_{sig}$ to a central hardware arbiter at commit time. The arbiter orders each commit request, and broadcasts the $W_{sig}$ to other processors. Every recipient uses the forwarded $W_{sig}$ to check for conflicts and abort its active transaction; it also sends an ACK as a response to the arbiter. The arbiter collects all the ACKs and then allows the committing processor to complete. This process adds 97 cycles to a transaction, assuming unloaded links (latencies are listed in Table 3(a)) and arbiter. The Serial version services only one commit request at a time (queuing up any others), while Parallel services all non-conflicting transactions in parallel (assumes infinite buffers in the arbiter). Central arbiters are similar in spirit to BulkSC [6], but serve only to order commits; they do not interact with the L2 directory.

We present results (see FIG. 5) for HashTable, Vacation-Low, LFUCache, and RandomGraph (we eliminate Delaunay since the transaction phases have negligible impact on overall throughput and RBTree since it demonstrates a similar pattern to Vacation). We enumerate the general trends below:

Arbitration latency for the Central commit scheme is on the critical path of transactions. This gives rise to noticeable overhead in the case of short transactions (e.g., HashTable and LFUCache) at all thread levels. CSTs simplify the commit process, in the absence of conflicts, commit requires only a single memory operation on a transaction's cached TSW.

At higher thread levels, the benchmarks that are inherently parallel (HashTable and Vacation-Low) suffer from serialization of commits in Central-Serial, as transactions wait for predecessors in the queue. Central-Parallel removes the serialization overhead, but still suffers from commit arbitration latency at all thread levels.

In benchmarks with high conflicts (e.g., LFUCache and RandomGraph) that don't inherently scale, Central's conflict management strategy avoids performance degradation. The transaction being serviced by the arbiter always commits successfully, ensuring progress and livelock freedom. The current distributed protocol allows the possibility of livelock. However, the CSTs streamline the commit process, narrow the vulnerability window (to essentially the inter-processor message latency) and eliminate the problem as effectively as Central.

At low conflict levels, a CST-based commit requires mostly local operations and its performance should be comparable to an ideal Central-Parallel (i.e., zero message and arbitration latency). At high conflict levels, the penalties of Central are lower compared to the overhead of aborts and workload inherent serialization. Finally, the influence of commit latency on performance is dependent on transaction latency (e.g., reducing commit latency helps Central-Parallel approach FlexTM's throughput in HashTable but has negligible impact on Random-Graph's throughput).

Result 3a: When applications get to use the machine in isolation, lazy conflict management exploits available resources to maximize concurrency and encourage forward progress.

Result 3b: With multiprogramming, lazy management results in doomed but executing transactions occupying physical resources that could be otherwise utilized. Eager management may free-up physical resources for other useful work.

FIGS. 6(a)-(d) illustrate the potential benefit of lazy conflict management in FlexTM—specifically, the ability to eliminate the performance pathologies observed in RBTree, Vacation-High, LFUCache, and RandomGraph. (In applications with very few conflicts [e.g., HashTable and Vacation-Low], eager and lazy management yield almost identical results.)

RBTree and Vacation-High embody similar tradeoffs in conflict management policy. At low contention levels, Eager and Lazy yield similar performance. Beyond 4 threads Lazy scales better than Eager. Lazy management permits reader-writer concurrency, which pays off when the readers commit first. At 16 threads, Lazy's advantage over Eager is 16% in RBTree and 27% in Vacation-High.

LFUCache admits no concurrency, since transactions conflict on the same cache line with high probability. On conflict, the contention manager performs back-off within the active transaction. With high levels of contention, eager management causes a cascade of futile stalls in doomed transactions. It also reduces concurrency by creating a large window of conflict vulnerability (first-access to commit-time). In lazy mode, transactions abort enemies at commit-time, by which time the likelihood of committing is very high. Hence, with lazy management, throughput improves only marginally (10% at 16 threads), while eager management causes performance to degrade.

RandomGraph transactions livelock in eager mode at higher thread levels. In eager mode, it is highly likely for transactions to detect and arbitrate conflicts on a highly contended object, giving rise to multitransaction dueling aborts. With lazy conflict management, once a transaction aborts an enemy at committime, the remaining window of vulnerability is very small, and the transaction is quite likely to commit. With lazy management, RandomGraph attains a flat scalability curve.

Figure 6:
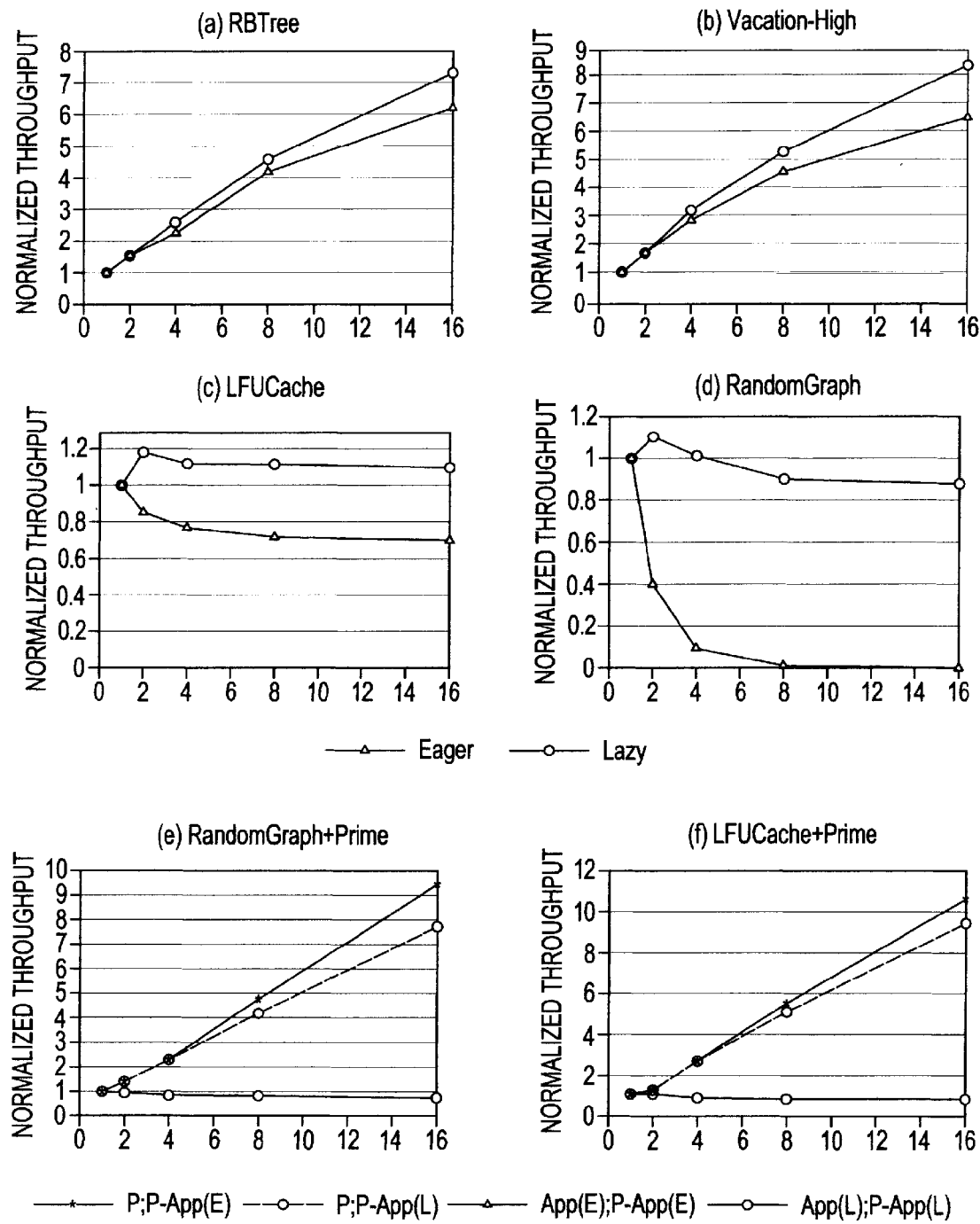
FIG. 6 shows performance of eager vs. lazy conflict management in the preferred embodiment.

In a second set of experiments (see FIGS. 6(e) and 6(f)), we analyze the impact of conflict management on background applications. We experimented with both transactional and non-transactional workloads; for brevity we present only the latter here: a CPU intensive application (Prime Factorization) sharing the machine with a non-scalable transactional workload (LFUCache or RandomGraph). We minimized extraneous overheads by controlling workload schedules at the user level: on transaction abort the thread yields to compute-intensive work.

We found that Prime scales better when running with eager mode transactions (~20% better than lazy in RandomGraph), because eager mode detects doomed transactions earlier and immediately yields the CPU to useful work. Lazy mode is optimistic and takes longer to detect impending aborts. It also delays the restart of commit-worthy transactions. Significantly, yielding to the background application did not negatively impact the throughput of the transactional application, since LFUCache and RandomGraph have little concurrency anyway. By effectively serializing transactions, yielding also avoids the livelock encountered by Eager RandomGraph.

Result 4: FlexTM's signatures and AOU are useful for general purpose memory monitoring Modern microprocessors provide limited support for debuggers through watchpoint registers (e.g., 4 on the x86). FlexTM provides two mechanisms to watch memory: (1) AOU—precisely monitors cache-block aligned regions but is limited by private cache size, and (2) Signatures—provide unbounded monitoring support but are vulnerable to false positives. AOU provides a naturally simple interface. To enable software to use signatures effectively we explore a limited extension to the interface described above (see Table 4(a)). Essentially, all loads and stores test membership in the signature and on a hit the hardware effects an alert to a registered handler. Armed with this interface, we develop a tool, FlexWatcher, to detect buffer overflows and memory leaks. FlexWatcher adds the addresses to be monitored to $R_{sig}$ and $W_{sig}$ and activates monitoring. All local accesses are checked against the activated signature. On an alert, the software handler disambiguates and checks to see if the address was actually being watched.

We evaluate the efficiency of FlexWatcher using "Bug-Bench," a set of real-life programs with known memory bugs. Table 4(b) displays the slowdown encountered when running the application with FlexWatcher. These are compared to slowdowns for "Discover", a SPARC binary instrumenter distributed by OpenSPARC.net.3 The overheads depend on a variety of factors, including number of mallocs, heap allocated, and frequency of memory accesses. They vary between 5% and 2.5× for FlexTM, compared to 17×-75× for Discover. In the future we hope to develop software tools to exploit other FlexTM hardware components (i.e., CST and PDI).

TABLE 4(a)

| Signature API | |
|---|---|
| insert [% r], Sig | Add address [% r] into signature |
| member [% r], Sig | Test membership of [% r] and set/clear flag |
| read-hash [% r] | Return hashed value of address [% r] |
| activate Sig | Switch On local access monitoring |
| clear Sig | Zero-out signature |

Sig. can be $R_{sig}$ or $W_{sig}$

TABLE 4(b)

FlexWatcher Vs Software

| Program | Bug | FlexWatcher | Discover |
|---|---|---|---|
| BC-BO | BO | 1.50× | 75× |
| Gzip-BO | BO | 1.15× | 17× |
| Gzip-IV | IV | 1.05× | N/A |
| Man | BO | 1.80× | 65× |
| Squid | ML | 2.5× | N/A |

N/A - Discover did not support this benchmark
BO(Buffer Overflow) - Solution: Pad all heap allocated buffers with 64 bytes and watch padded locations for modification.
ML(Memory Leak) - Solution: Monitor all heap allocated objects and update the object's timestamp on each access trap.
IV(Invariant Violation) - Solution: ALoad the cache block corresponding to variable X. When the software handler is invoked on access, assert program specific invariants.

FlexTM introduces Conflict Summary Tables; combines them with Bloom filter signatures, alert-on-update, and programmable data isolation; and virtualizes the combination across context switches, overflow, and page-out. It (1) decouples access tracking and conflict detection from conflict management; (2) tracks conflicts on a thread-by-thread basis, rather than a location-by-location basis; (3) allows software to dictate policy without the overhead of separate metadata; and (4) enables individual TM components to be used for non-transactional purposes. To the best of our knowledge, it is the first hardware TM in which lazy transactions can commit or abort in parallel on the basis of purely local information (It also supports eager transactions.).

By eliminating the need for metadata bookkeeping, FlexTM outperforms both pure and hardware-accelerated STM systems. Specifically, on a variety of benchmarks, our experiments reveal performance comparable to that of fixed-policy HTM systems, and 5× faster than RSTM and TL2. Our results also confirm that the choice between eager and lazy conflict management depends on the offered workload, highlighting the value of policy flexibility. Our experiments with FlexWatcher, a memory debugger tool that uses signatures and AOU for low-overhead memory monitoring, illustrate the applicability of FlexTM hardware to nontransactional tasks.

While a preferred embodiment has been set forth above, those skilled in the art who have reviewed the present disclosure will readily appreciate that other embodiments can be realized within the scope of the invention. For example, we could enrich our semantics with hardware support for nesting, or study the interplay of conflict detection and management policies. We could also develop more general interfaces to FlexTM style hardware, and apply it to problems in security, debugging, and fault tolerance. Therefore, the present invention should be construed as limited only by the appended claims.

What we claim is:

1. A method in a shared-memory multiprocessor of decoupling a detection of conflicting concurrent accesses to memory from an action taken in response to the detected conflicts, the method comprising:
   providing a plurality of processor cores, each processor core of said plurality of processor cores having one or more local caches;
   permitting software on each processor core of said plurality of processor cores to specify that certain reads and writes are speculative and should commit together as a transaction, or be rolled back;
   permitting said local caches of said plurality of processor cores to retain copies of speculatively read or written lines despite an occurrence of conflicting concurrent speculative reads or writes;
   monitoring activities of said plurality of processor cores for an occurrence of one or more of said conflicting concurrent speculative reads or writes and summarizing said occurrences in one or more conflict summary tables (CST) for each processor core of said plurality of processor cores as a software-visible indication of zero or more other processor cores of said plurality of processor cores on which concurrent speculative reads or writes that conflict with speculative reads or writes of said processor core have occurred; and
   ensuring that transactions commit atomically and memory remains consistent provided that requests by software to commit a transaction are made only in an absence of concurrent nonspeculative or committed reads or writes that conflict with the reads or writes of the transaction.

2. The method of claim 1, wherein said one or more CSTs comprise a vector indexed by one or more identifiers of other processor cores of said plurality of processor cores.

3. The method of claim 1, further comprising virtualizing conflict information including a content of said one or more CSTs across context switches on a per-thread basis.

4. The method of claim 1, wherein software that has performed a transaction comprising one or more speculative reads or writes on a processor core of said plurality of processor cores inspects said one or more CSTs of said processor core to decide locally and without broadcast or centralized control whether to attempt to commit said transaction.

5. The method of claim 4, wherein said software running on said processor core of said plurality of processor cores, having decided to attempt to commit said transaction, performs an operation to abort a speculation on each remote processor core on which concurrent speculative reads or writes that conflict with said transaction have occurred.

6. The method of claim 1, further comprising maintaining, for each processor core, read and write signatures that provide a concise record of all cache lines that have been speculatively read or written by that processor core, wherein said signatures are used on each cache coherence protocol interaction to update said one or more CSTs.

7. A hybrid hardware-software transactional memory system for a shared-memory multiprocessor, the system comprising:
   a plurality of processor cores, each processor core of said plurality of processor cores having one or more local caches;

software configured to run on each processor core of said plurality of processor cores and to specify when certain reads and writes are speculative and should commit together as a transaction, or be rolled back;

cache controllers coupled to each of said local caches, said cache controllers configured to permit the local caches of said plurality of processor cores to retain copies of speculatively read or written lines despite an occurrence of one or more conflicting concurrent speculative reads or writes;

one or more conflict summary tables (CST) coupled to each processor core of said plurality of processor cores;

a conflict detection mechanism configured to monitor activities of said plurality of processor cores for an occurrence of said one or more conflicting concurrent speculative reads or writes and to summarize said occurrences in said one or more CSTs as a software-visible indication of zero or more other processor cores of said plurality of processor cores on which concurrent speculative reads or writes that conflict with speculative reads or writes of said processor core have occurred; and a coherence protocol means configured to ensure that committed transactions are atomic and that memory is consistent provided that requests by said software to commit a transaction are made only in an absence of concurrent nonspeculative or committed reads or writes that conflict with the reads or writes of said transaction.

8. The system of claim 7, wherein said one or more CSTs comprise a vector indexed by one or more identifiers of other processor cores of said plurality of processor cores.

9. The system of claim 7, wherein said software virtualizes conflict information including a content of said one or more CSTs across context switches on a per-thread basis.

10. The system of claim 7, wherein said software, having performed a transaction comprising one or more speculative reads or writes on a processor core of said plurality of processor cores, is further configured to inspect said one or more CSTs of said processor core to decide locally and without broadcast or centralized control whether to attempt to commit said transaction.

11. The system of claim 10, further comprising a mechanism to abort a remote transaction, wherein said software, having decided to attempt to commit a local transaction, causes said mechanism to invoke for each remote processor core on which concurrent speculative reads or writes that conflict with said local transaction have occurred.

12. The system of claim 7, further comprising, for each processor core, one or more read and write signatures that provide a concise record of cache lines that have been speculatively read or written by that processor core, wherein said one or more read and write signatures are used on each cache coherence protocol interaction to update said one or more CSTs.

* * * * *